United States Patent [19]

Stracke, Jr.

[11] Patent Number: 5,892,761
[45] Date of Patent: Apr. 6, 1999

[54] METHOD AND APPARATUS FOR ROUTING DATA IN COLLABORATIVE COMPUTING SYSTEM

[75] Inventor: John Richard Stracke, Jr., Mechanicsburg, Pa.

[73] Assignee: Netscape Communications Corporation, Mountain View, Calif.

[21] Appl. No.: 550,670

[22] Filed: Oct. 31, 1995

[51] Int. Cl.$^6$ .................................................. H04L 12/56
[52] U.S. Cl. ........................... 370/395; 370/410; 370/474
[58] Field of Search .......................... 370/62, 60.1, 68.1, 370/54, 60, 85.13, 85.14, 99, 94.1, 110.1, 389, 392, 395–399, 400, 401, 409, 410, 474, 475, 522, 431, 390, 432; 395/200.04, 200.12, 200.15, 200.16, 200.17

[56] References Cited

U.S. PATENT DOCUMENTS

| | | | |
|---|---|---|---|
| 5,237,571 | 8/1993 | Cotton | 370/390 |
| 5,420,858 | 5/1995 | Marshall et al. | 370/60.1 |
| 5,537,408 | 7/1996 | Branstad et al. | 370/79 |

OTHER PUBLICATIONS

J. Moy, OSPF Version 2 (Mar. 1994), Internet Engineering Task Force, Request for Comments #1583, pp. 1–187.
J. Moy, Multicast Extensions to OSPF (Mar. 1994), Internet Engineering Task Force, Request for Comments #1584, pp. 1–88.
ATM User–Network Interface (UNI) Specification, Version 3.1, ATM Forum, Prentice–Hall PTR, Upper Saddle River, NJ (1995), Sections 3.3 and 5.1.2, (pp. 52–55, 153–159).
ATM User–Network Interface (UNI) Specification, Version 3.1, ATM Forum, Prentice–Hall, Upper Saddle River, NJ (1995) Sections 3.4.1 and 3.4.4 (pp. 56, 59, and 60).
Goralski, Introduction to ATM Networking, McGraw–Hill, pp. 201–207, pp. 236–241, 1995.
Charny et al., Congestion Control with Explicit Rate Indication, ATM Forum/94–0692, Jul. 1994.

*Primary Examiner*—Douglas W. Olms
*Assistant Examiner*—David R Vincent
*Attorney, Agent, or Firm*—Michael A. Glenn

[57] ABSTRACT

A collaborative computing system includes a plurality of collaborative computing participants, connected over a network. Each collaborative computing participant has a workstation that includes a conference engine, which provides a network interface between applications and the network. The applications are organized into application modules, each of which provides a collaborative computing function. Either the conference engine or the application modules fragment a data packet to be sent to other participants into a set of equally-sized cells. The cells are transmitted individually over the network via switching entities, which can be other participants in the collaborative session. Each switching entity maintains a list of connections from itself to other switching entities.

28 Claims, 2 Drawing Sheets

METHOD AND APPARATUS FOR ROUTING DATA IN COLLABORATIVE COMPUTING SYSTEM

FIELD OF THE INVENTION

This invention relates to the field of collaborative computing and, more particularly, to the routing of data in a collaborative computing system.

BACKGROUND OF THE INVENTION

In desktop video conferencing and other desktop collaboration systems, data needs to be sent among participants in the collaborative session. Some of the participants may be connected over a local area network (LAN), while others may be located at a remote site and connected via a wide area network (WAN). Frequently, each participant must be able to send graphic, text, video, or other data directly to all of the other participants.

In existing systems, a participant typically sends data to the other participants by sending the entire packet of data serially to each other participant. This can be very inefficient. The sending of large packets of data ties up bandwidth on the networks and the same data may be transmitted repeatedly over the same path.

The present invention overcomes this and other problems, as will be shown in the remainder of the specification, referring to the attached drawings.

SUMMARY OF THE INVENTION

The present invention permits more efficient transmission of data in a collaborative computing system by dividing data packets into cells (or fragments) and employing switching entities, which efficiently direct the routing of the cells to the intended participants.

In a preferred embodiment, a collaborative session involves a number of workstations linked together over LANs, WANs, and/or other means. Each workstation has a conference engine, which serves as an interface between collaborative computing applications and the network. Collaborative computing applications are built around one or more application modules, each of which provides a collaborative computing function such as an audio tool or a video tool. The application modules connect to the conference engine and may connect to specialized hardware (e.g., a graphics board). A system utilizing this collaborative computing structure is described in commonly assigned U.S. patent application Ser. No. 08/401,922, entitled "Apparatus for Collaborative Computing," which is incorporated herein by reference. Alternatively, other collaborative computing architectures can be used.

Each workstation/participant is able to fragment a data packet intended for one or more other participants into cells. The fragmentation occurs in a cellular factory, which may be either a conference engine (a cellular engine) or an application module (a cellular application module). Preferably, each cell has the same fixed length, which is the Maximum Transmission Unit (MTU) of the conference engine. The cellular factory sends cells (rather than the larger data packets) to other cellular factories.

Where the cellular factory is a conference engine, that conference engine can receive data packets from an attached application module that is not a cellular factory (i.e., a conventional, non-cellular application module), and turn the packets into cells. On the receiving end, the cellular conference engine receives cells and turns them into data packets for application modules that are not cellular factories.

Where the cellular factory is an application module, the cells are passed from the application module to the sender's conference engine, where they are transmitted to the recipients' conference engines. The receiving conference engines pass the cells onto their application modules that correspond to the sending application module or to whichever other application module or modules the packet was addressed.

Cells are routed from the sender's cellular factory to the recipients' cellular factories via switching entities, which may be cellular conference engines and/or cellular switches. A cellular switch is a dedicated switching node of a collaboration service, such as a multimedia collaboration service.

A cell will be routed only once to a switching entity, which then passes the cell on to other switching entities, until the cell is transmitted to the receiving cellular factories.

DETAILED DESCRIPTION OF PREFERRED EMBODIMENTS

Figure 1:
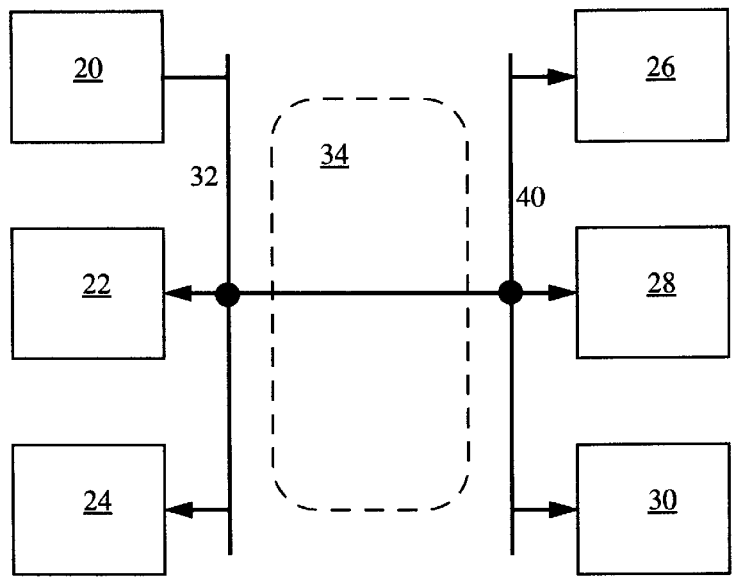
FIG. 1 is a block diagram of the structure of a prior art routing system.

An existing routing system for a collaborative session is shown in FIG. 1. With such a system, a data packet being sent by workstation 20 and intended for all of the other participants (illustrated by workstations 22, 24, 26, 28, and 30) is individually sent to each other workstation. Workstations 22 and 24 receive the packet over LAN 32, while workstations 26, 28, and 30 receive the packet via LAN 32, WAN 34, and LAN 40. Thus, the same relatively large packet is sent five times (in this illustration) over LAN 32 and three times over WAN 34 and LAN 40, tying up bandwidth.

Figure 2:
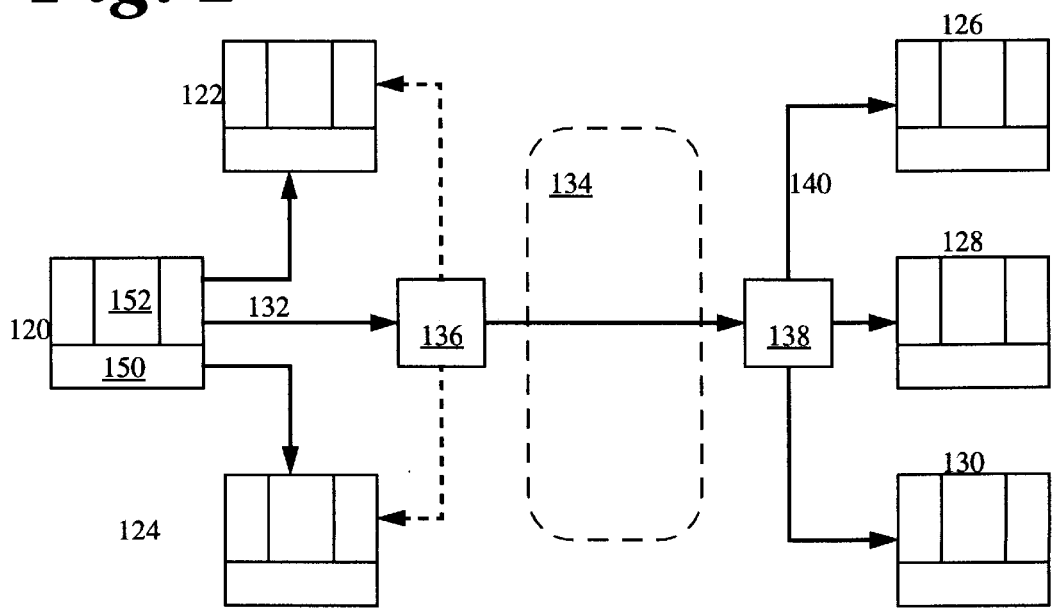
FIG. 2 is a block diagram of a structure of a routing system according to the present invention.

In the present invention, as shown in FIG. 2, workstation 120 desires to send data to the other participants in a collaborative session (workstations 122, 124, 126, 128, and 130). Preferably, the data is sent over LAN 132 to workstations 122 and 124, and to switching entity 136. The header (described below) for the data sent to switching entity 136 indicates that the data is to be sent to participants 126, 128, and 130. Switching entity 136 then transmits the data directly once over WAN 134 to switching entity 138. Switching entity 138 then transmits the data directly to workstations 126, 128, and 130 via LAN 140. Alternatively, workstation 120 could send the data only once over LAN 132, to switching entity 136. In that case, switching entity 136 would transmit the data directly to workstations 122 and 124 (as indicated by the dotted lines), and over WAN 134 to switching entity 138, for transmission to workstations 126, 128, and 130. Although switching entities 136 and 138 have been described as dedicated cellular switches, they could also be part of the workstations of participants in the collaborative session. It is understood that in actual operation, a different number of switching entities and other network arrangements could be used.

Each workstation includes a conference engine 150 and at least one application module 152. The application modules each provide a discrete collaborative computing service, such as a text tool, an audio tool, or a video tool. Conference engine 150 provides a network-independent interface to collaborative computing applications and users, and provides conference management functions and data and message distribution. These elements and functions are described in greater detail in U.S. patent application Ser. No. 08/401,922.

Figure 3:
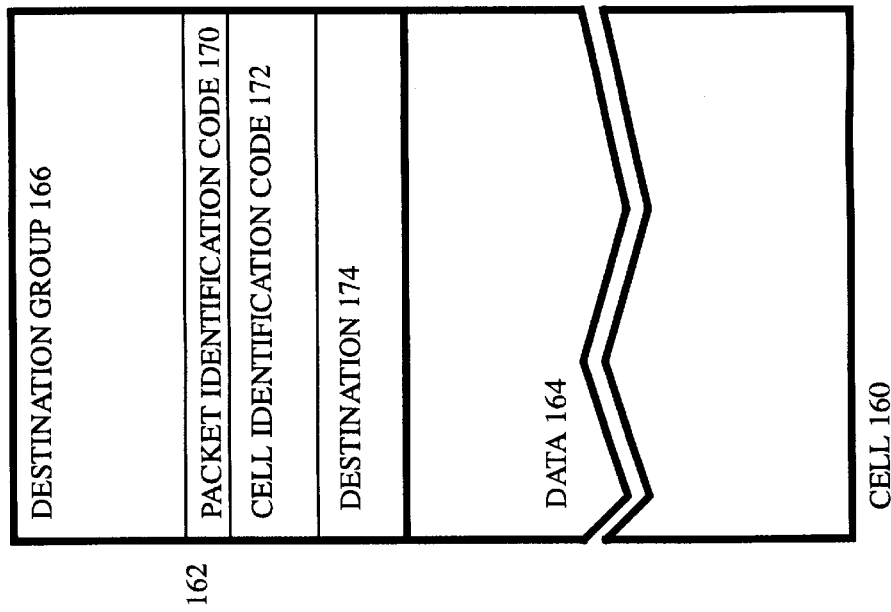
FIG. 3 is a detail of a first form of a cell of the routing system according to the present invention.

In one embodiment, the cellular factory is a conference engine 150, which receives a packet from an application module 152. As shown in FIG. 3, the packet is fragmented into a series of cells 160, each of which has a header portion 162 and a data (or payload) portion 164. Each cell has a size M, which preferably is equal to the MTU of the conference engine. The use of fixed size cells permits more efficient buffer management. If the header (the contents of which are described in detail below) has a length H, then the payload P is M- H bytes long. The first P bytes of the packet, which will include the packet header, are placed in the payload of the first cell. Each subsequent cell is then filled with the subsequent P bytes of the packet until the packet has been fully fragmented into cells. Preferably, the actual filling of cells is performed by a function that receives a cell header and a pointer to the section of the packet from which to begin filling the cell payload. Each cell has M bytes (P bytes of payload), so the final portion of the last cell may not be significant. The packet header identifies the length of the packet. Thus, a packet of length N will require (N+P−1) DIV P cells, and the last cell will contain P bytes of data from the packet if N MOD P=0, and N MOD P bytes of data from the packet if N MOD P≠0. The remaining bytes of data (if any) in the last cell will not be significant.

Preferably, each cell is 256 bytes long. This is long enough so that most packets can be carried in one cell each, but small enough to permit efficient use of bandwidth. The first cell carries the packet header, which in a preferred embodiment is utilized to reduce the amount of information that must be carried in the cell header, as explained below.

Once created, the cells are sent over the network. At the receiving end, the cells are recombined into a packet by a cellular engine, and then transferred as a packet to the application module 152 designated by the sending application module. The cellular engine has received a complete packet when the number of data bytes received for a packet is greater than or equal to the packet size (as determined from the packet header).

Preferably, the transmission of the cell is accomplished with hop-by-hop virtual circuits, which permit the cell to be sent from one switching entity to the next, without establishing an end-to-end path for the cell. The use of hop-by-hop virtual circuits avoids the excessive delays likely to occur in establishing an end-to-end path. In a preferred embodiment, a virtual circuit is predefined for each participant in the collaborative session, and a virtual circuit is predefined for the situation where a message is to be sent to all members of the collaborative session.

To establish and use the virtual circuits, each cellular entity E (that is, each cellular factory and each other switching entity in the collaborative session) maintains a cache of $N_E$ outgoing virtual circuits and a group bitmap B of possible recipients of a message. An entry in the cache relates the virtual circuit to the bitmap B. That is, the entry identifies the recipients that will use that virtual circuit. In a preferred embodiment, where there are M possible recipients of a message (and group bitmap B requires M bits), virtual circuit i will correspond to a set of recipients containing only recipient i, and virtual circuit (M+1), or some other virtual circuit with a number larger than M, will correspond to the set of recipients containing all members of the collaborative session (other than the cellular entity E using that set of virtual circuits).

For each entity F to which an entity E is connected, E maintains a table to translate F's virtual circuit ID's into bitmaps. The size of each table is $N_F$ (which F transmits to E during establishment of the collaborative session). These tables are used to determine the particular entities F to which to send a cell destined for a group B of recipients.

When entity E needs to send a cell to group B, it looks up B in its cache. If E finds B, it uses the associated virtual circuit ID for that cell. If E does not find B, it allocates a new virtual circuit ID for that group and notifies each entity F to which it is connected of the new virtual circuit ID. This allows each entity F to update its translation table. If all cache entries are in use, E reuses one, preferably replacing the least recently used cache entry.

If, for example, entity E is sending a cell to group B, and could send the cell to entities F1, F2, and F3, which provide routes to groups B1, B2, and B3, respectively, then entity E will send the cell to each of these entities over a virtual circuit that corresponds to the overlap of group B and the group corresponding to the destination cell. For example, entity E will send the cell to entity F1 over a virtual circuit that corresponds to the overlap of group B and group B1. If there is no overlap between group B and the group B1 corresponding to entity F1, then the cell is not sent to that entity.

When an entity E receives a cell from entity F on virtual circuit C, it looks up C's corresponding group bitmap B in its table for entity F, then looks up the appropriate virtual circuit (or circuits) in its cache.

Alternatively, other algorithms could be used to define and use virtual circuits.

Instead of using virtual circuits, cell transmission can be accomplished using bitmaps of recipients. In this embodiment, each switching entity maintains a table of connections to other switching entities. Each connection is marked with a bitmap of users reachable through that connection. Preferably, the tables are created without overlap, so there are no redundant routes.

When a cell arrives with a bitmap B indicating a set B[R] of recipients, the switching entity searches its table of connections (except the connection from which the cell arrived). For each connection C, the switching entity compares the bitmap B[R] of recipients to its bitmap B[C]. If B[R] includes no recipients in B[C], then the cell is not sent over connection C. If B[R] includes at least one recipient in B[C], then the cell is sent over that connection.

Preferably, there are at most 64 members of a collaborative session, so that the bitmaps of recipients can be limited to 64-bit fields. When using a 64-bit computer, this permits the bitmaps to be held in a single central processing unit (CPU) register and manipulated with a single machine instruction. However, other numbers of users could be used.

The header for each cell depends on whether a virtual circuit structure or a bitmapped structure is used for transmission. In the simplest case, the header 162 for a bitmapped structure, as shown in FIG. 3, would be 18 bytes long: 8 bytes (64 bits) to identify the destination group 166; 2 bytes for a packet identification code 170; 4 bytes for a cell identification code (that is, which cell within the packet) 172; and 4 bytes to identify the destination application module 174 at each conference engine. However, this can be reduced to 14 bytes if the cellular engine uses the packet header (which is part of the data for the first cell) to identify the destination application module. This permits elimination of the destination application module field 174 from the header.

Figure 4:
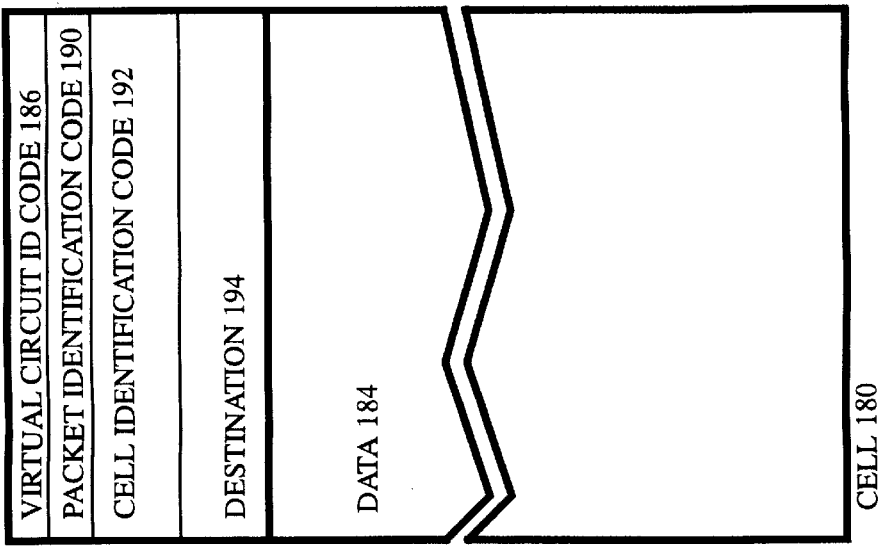
FIG. 4 is a detail of a second form of a cell of the routing system according to the present invention.

The header for a virtual circuit structure, in the simplest case, would be 12 bytes long. FIG. 4 depicts a cell 180 with a header 182 for a virtual circuit structure and a data portion 184. Header 182 includes: 2 bytes for the virtual circuit identification code 186; 2 bytes for a packet identification code 190; 4 bytes for a cell identification code 192; and 4 bytes to identify the destination application module 194. However, this can be reduced to 8 bytes by eliminating the destination application module field 194, as described above. Signalling cells, described below, have a virtual circuit identification code of 0.

The packet identification code should be "semiunique". That is, there should not be two packets being transmitted with the same identification code at the same time. Assuming, as above, that there are at most 64 members of a collaborative session, the packet identification code preferably uses 6 bits to identify the sender, 7 bits to identify the particular application module sending the packet, and 3 bits to identify the particular packet being sent by that application module. This 3-bit sequence number would increment (modulo 8) with each packet being sent, allowing an application module to send up to 8 packets simultaneously.

Cell identification codes are assigned sequentially, beginning with a cell identification code of 1, to each cell of a given packet.

Signalling cells are used to open and close connections and virtual circuits, and to report which members are behind a connection. Preferably, the 2-byte packet identification code in the header identifies the type of signalling cell. The signalling cell can be of five types: an open connection cell, a close connection cell, an open virtual circuit cell, a close virtual circuit cell, or a link state cell.

An open connection cell is used to open a switch-to-switch connection. In one embodiment, the switch binds to a different network port for each conference. Alternatively, each switch can have a unique switch identification code. Preferably, the switch identification code is four bytes long, and can be in the data portion of the cell or in the cell identification code portion of the header. Placing the switch identification code in the header permits the entire information contained in an open connection cell to fit in an eight-byte register (assuming the destination application module field is not part of the header, as described above). Preferably, an open connection cell also identifies whether the connecting entity is a cellular engine or a cellular switch.

A close connection cell is used to close a switch-to-switch connection. No argument is required for a close connection cell, because the connection over which the message was received will be the connection being closed.

An open virtual circuit cell is used to open a virtual circuit from an entity E through an entity F to a bitmap B of members. The open virtual circuit cell indicates both the virtual circuit identification code and the bitmap B of members. The virtual circuit identification code is 2 bytes, which can be included in the cell identification code portion of the header or in the data portion of the cell. The bitmap B, which is 8 bytes long, as discussed above, is in the data portion of the cell.

A close virtual circuit cell is used to close a virtual circuit. It includes the virtual circuit being closed, which can be included in the cell identification code portion of the header or in the data portion of the cell.

A link state cell provides updated information, in the form of one or more entries, regarding the link between two switching entities. When a new link is created, a link state cell contains an entry for the newly generated link and entries for each link known to the switching entity originating the link state cell. This permits the other switching entities to learn the switching entities available through a particular link. When the state of a link is updated, a link state cell contains a single entry for the updated link.

Each entry of a link state cell includes: the user handles of the two switching entities joined by the link, with the lower handle listed first; a dimensionless cost of using the link; the state of the link (available or unavailable); and a sequence number for the link which is assigned by the switching entity that originates the link state cell. Preferably, a link state cell is originated by the switching entity with the higher handle when a link becomes available and is originated by both switching entities when a link becomes unavailable. In either case, the link state cell is then propagated through the network.

In a preferred embodiment, the links are propagated through the network in a manner that ensures that cellular engines will not carry transit traffic for each other (i.e., only cellular switches carry transit traffic) and cellular switches do not use a cellular switch to carry traffic for other cellular engines on the same LAN. Thus, when a link state changes, a link state cell is not necessarily sent to any or every switching entity connected to the originator of the cell. For example, if both the switching entities in the newly available or unavailable link are cellular engines, then a link state cell is not sent. Also, if one of the switching entities is a cellular engine, then a link state cell is not sent from the cellular switch to another cellular engine. However, these particular rules for the use of cellular engines and cellular switches are not necessary. They can be modified where appropriate for a particular application, such as to ensure that a connection between two cellular engines exists even if the direct link between the cellular switches is unavailable.

When a switching entity receives a link state cell it examines each entry, or report. To determine whether the link state cell provides the most current state of the link, the receiving switching entity examines the sequence number. If the sequence number is not higher than the sequence number of the most recent report for that link, the report is discarded as having been received out of sequence. Thus, the report is not forwarded to other switching entities and is not used to update the receiving switching entity's map of the network. By discarding the report, the switching entity prevents the outdated report from being continually propagated and ensures that the network map reflects the most recently available information.

If the report for a particular link is not discarded (i.e., because the sequence number is higher than the sequence number of the most recent report for that link), that entry in the link state cell is forwarded to each switching entity to which the switching entity is connected, other than the switching entity from which the report was received and subject to the propagation rules in place for the network (e.g., the rules described above for ensuring that cellular engines will not carry transit traffic for each other and cellular switches do not use a cellular switch to carry traffic for other cellular engines on the same LAN). In addition, the switching entity updates its map of the network.

Preferably, the map of the network is in the form of an undirected graph, in which vertices represent switching entities and edges represent links. Each edge is labelled with the cost of the link it represents. When the map is updated, the switching entity updates bitmaps of recipients which it associates with each connection, marking which connection should be used for each recipient in order to obtain the lowest total cost path through the network.

Each switching entity maintains a sequence counter. In a preferred embodiment, the switching entity with the higher handle increments its sequence number each time it originates a new link state cell and includes the incremented sequence counter in the cell; when a link becomes unavailable, the switching entity with the lower handle uses the most recent sequence number it has received from the switching entity with the higher handle, incremented by one. This will be less than or equal to the sequence number that the switching entity with the higher handle uses. Consequently, the report that the switching entity with the lower handle sends will have a higher sequence number than any report previously sent by the switching entity with the higher handle but will be lower than any report subsequently sent by the switching entity with the higher handle. The switching entity can maintain a single global counter, which is used for each link, or a separate counter for each link.

When a cellular engine receives the first cell of a packet, it stores the packet identification code from the cell header. In a preferred embodiment, the cellular engine also examines the packet header to determine the length of the packet and the destination application module. If the destination application module is a cellular application module, the cellular engine forwards the cell to the module. If the destination application module is not a cellular application module, then the cellular engine begins to assemble the packet.

When the cellular engine receives a subsequent cell, it matches it with the packet identification code stored previously, and either forwards the cell to the appropriate application module (if the application module is a cellular application module) or appends the cell to the packet being assembled.

Once the cellular engine receives the final cell (which it determines from knowing the length of the packet and the number of cells received), it sends a message back to the sending cellular engine that the packet has been received. In addition, if the destination application module is not a cellular application module, the cellular engine forwards the completed packet to the application module, using the packet header to identify the appropriate application module.

Instead of the cellular factory being a conference engine, the cellular factory can be an application module. The application module fragments a packet into cells in the same manner as a cellular engine. Where the application module is a cellular factory, the conference engine also will be cellular (i.e., it will be a cellular engine). In this case, the receiving cellular engine sends each cell from the same packet (determined from the packet identification code) to the appropriate cellular application module. The cellular engine determines the appropriate cellular application module from the packet header in the data of the first cell, and sends subsequent cells with the same packet identification code and a cell identification code greater than 1 to the determined application module. A subsequent cell with the same packet identification code but a cell identification code of 1 will be part of a subsequent packet.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

What is claimed is:

1. A method for routing a data packet in a collaborative computing system comprising:

fragmenting the data packet into one or more data cells, each data cell including a header and a payload;

inserting into the header of each data cell a packet identification code and a cell identification code;

establishing a link between an originating collaborative computing node and a receiving collaborative computing node by transmitting a signal cell from the originating collaborative computing node to the receiving collaborative computing node without transmitting a signal cell from the receiving collaborative computing node to the originating collaborative computing node;

transmitting each data cell from the originating collaborative computing node to one or more receiving collaborative computing nodes; and combining each data cell at each receiving collaborative computing node into a packet containing the same information as the data packet.

2. A method for routing a data packet as in claim 1, wherein the inserting step further includes inserting into the header an indication of each receiving collaborative computing node.

3. A method for routing a data packet as in claim 1, wherein the inserting step further includes inserting into the header a virtual circuit identification code.

4. A method for routing a data packet as in claim 1, wherein each data cell is the same size.

5. A method for routing a data packet as in claim 1, wherein the transmitting each data cell step includes the steps of transmitting each data cell from the originating collaborative computing node to an intermediate switching entity and transmitting each data cell from the intermediate switching entity to the one or more receiving collaborative computing nodes.

6. A method for routing a data packet as in claim 5, wherein the packet identification code includes a sender identifier and a sequence number.

7. A method for routing a data packet as in claim 5, wherein the packet identification code inserted into each data cell during the fragmenting step is the same and the cell identification code inserted into each data cell during the fragmenting step is incremented for each data cell.

8. A method for routing a data packet as in claim 5, further comprising the step of sending a signalling cell from the intermediate switching entity to the originating collaborative computing node when a connection between the intermediate switching entity and a receiving collaborative computing node changes.

9. A method for routing a data packet as in claim 8, wherein the step of sending a signalling cell includes sending an identification of the connection that has changed and of a state of the connection that has changed.

10. A method for routing a data packet as in claim 9, further comprising the step of updating a list of connections from the originating collaborative computing node to the one or more receiving collaborative computing nodes in response to receiving the signalling cell.

11. A method for routing a data packet as in claim 5, wherein the step of transmitting each data cell from the originating collaborative computing node to an intermediate switching entity includes transmitting each data cell from an originating collaborative computing node to a first switching entity and transmitting each data cell from the first switching entity to the intermediate switching entity.

12. An apparatus for routing a data packet in a collaborative computing system comprising:
   a plurality of switching entities including
      an originating collaborative computing node including a conference engine and at least one application module, the conference engine of the originating collaborative computing node including means for fragmenting a data packet into one or more cells; and
      a plurality of receiving collaborative computing nodes, each receiving collaborative computing node including a conference engine and at least one application module, the conference engine of each receiving collaborative computing node including means for combining one or more cells into a data packet; and
   a network connected to each switching entity.

13. An apparatus for routing a data packet according to claim 12, wherein each cell includes a header and a payload, the header including a packet identification code field and a cell identification code field.

14. An apparatus for routing a data packet according to claim 13, wherein each cell is the same size.

15. An apparatus for routing a data packet according to claim 13, wherein the header further includes a field for data representing each of the receiving collaborative computing nodes to which to route the data packet.

16. An apparatus for routing a data packet according to 15, wherein the originating collaborative computing node includes a table of connections from the originating collaborative computing node to other switching entities and includes for each of the other switching entities a list of the receiving collaborative computing nodes connected to the originating collaborative computing node through such other switching entity.

17. An apparatus for routing a data packet according to claim 13, wherein the header further includes a virtual circuit identification code field.

18. An apparatus for routing a data packet according to claim 17, wherein the originating collaborative computing node includes a list of outgoing virtual circuits and a list of the receiving collaborative computing nodes connected to the originating collaborative computing node over each of the outgoing virtual circuits.

19. An apparatus for routing a data packet according to claim 13, wherein each receiving collaborative computing node further includes means for fragmenting a data packet into one or more cells and the originating collaborative computing node further includes means for combining one or more cells into a data packet.

20. An apparatus for routing a data packet according to claim 13, wherein the plurality of switching entities further includes at least one cellular switch connected to the network between the originating collaborative computing node and one or more of the receiving collaborative computing nodes.

21. An apparatus for routing a data packet according to claim 20, further comprising means for propagating a state of a direct connection between two of the plurality of switching entities to each of the other switching entities connected to the two switching entities.

22. An apparatus for routing a data packet in a collaborative computing system, the collaborative computing system comprising a plurality of collaborative computing nodes all connected to a network, the apparatus comprising:
   an originating node, the originating node being one of the collaborative computing nodes and including a conference engine and at least one application module, the originating node's conference engine including means for fragmenting a data packet into one or more cells;
   a receiving node, the receiving node being one of the collaborative computing nodes other than the originating node and including a conference engine and at least one application module, the receiving node's conference engine including means for combining one or more cells into a data packet.

23. An apparatus according to claim 22, wherein each of the cells includes a header and a payload, the header including a packet identification code field and a cell identification code field.

24. A method for routing a data packet in a collaborative computing system comprising:
   fragmenting the data packet into one or more data cells, each data cell including a header and a payload;
   inserting into the header of each data cell a packet identification code and a cell identification code;
   transmitting a single signal cell from an originating collaborative computing node to an intermediate collaborative computing node to establish a link between the originating and intermediate collaborative computing nodes;
   transmitting a single signal cell from the intermediate collaborative computing node to a receiving collaborative computing node to establish a link between the intermediate and receiving collaborative computing nodes;
   transmitting each data cell from the originating collaborative computing node to the intermediate collaborative computing node;
   transmitting the data cells received by the intermediate collaborative computing node to the receiving collaborative computing node; and
   combining each data cell at the receiving collaborative computing node into a packet containing the same information as the data packet.

25. A method for routing a data packet in a collaborative computing system, the collaborative computing system including a first set of collaborative computing nodes all connected to a first sub-network, at least one other set of collaborative computing nodes all connected to a respective other sub-network, and an intermediate node coupling the first sub-network to one of the other sub-networks, the method comprising:
   fragmenting the data packet into one or more cells, each cell including a header and a payload;
   inserting into the header of each cell a packet identification code and a cell identification code;
   transmitting each cell no more than once over the first sub-network from an originating collaborative communication node in the first set to the intermediate node;
   transmitting each cell from the intermediate node to two or more receiving collaborative communication nodes connected to the one other sub-network; and
   combining each cell at each receiving collaborative communication node into a packet containing the same information as the data packet.

26. A method according to claim 25, wherein the intermediate node comprises at least one switching entity.

27. A method according to claim 25, wherein the intermediate node comprises two switching entities.

28. A method for routing a data packet in a collaborative computing system comprising:

fragmenting the data packet into one or more data cells, each data cell including a header and a payload;

inserting into the header of each data cell a packet identification code and a cell identification code;

establishing a link between an originating collaborative computing node and an intermediate collaborative computing node by transmitting a signal cell from the originating collaborative computing node to the intermediate collaborative computing node without transmitting a signal cell from the intermediate collaborative computing node to the originating collaborative computing node;

establishing a link between the intermediate collaborative computing node and a receiving collaborative computing node by transmitting a signal cell from the intermediate collaborative computing node to the receiving collaborative computing node without transmitting a signal cell from the receiving collaborative computing node to the intermediate collaborative computing node;

transmitting each data cell from the originating collaborative computing node to the intermediate collaborative computing node;

transmitting the data cells received by the intermediate collaborative computing node to the receiving collaborative computing node; and combining each data cell at the receiving collaborative computing node into a packet containing the same information as the data packet.

* * * * *